United States Patent [19]
Garrett

[11] 4,031,441
[45] June 21, 1977

[54] OPTICAL ENCODER

[75] Inventor: David Aubrey Garrett, Sutton, England

[73] Assignee: Vactric Control Equipment Limited, England

[22] Filed: June 6, 1975

[21] Appl. No.: 584,385

[30] Foreign Application Priority Data
June 7, 1974 United Kingdom ............ 25445/74

[52] U.S. Cl. ........................ 318/480; 250/231 SE; 250/233
[51] Int. Cl.² ........................................ G01D 5/36
[58] Field of Search ........................ 318/480, 313; 250/231 SE, 233

[56] References Cited

UNITED STATES PATENTS

| | | | |
|---|---|---|---|
| 3,693,023 | 9/1972 | Wasserman | 250/231 SE |
| 3,770,970 | 11/1973 | Trump | 250/231 SE |
| 3,886,354 | 5/1975 | Swiden | 250/231 SE |
| 3,894,232 | 7/1975 | Laspesa | 250/231 SE |
| 3,902,063 | 8/1975 | Oelsch et al. | 250/231 SE X |

Primary Examiner—B. Dobeck
Attorney, Agent, or Firm—St. Onge, Mayers, Steward & Reens

[57] ABSTRACT

An optical encoder comprises a housing capable of being clamped in an end wall of a motor or rotating component about its shaft, a shaft opening in the housing, a fixture for mounting an optical encoding disc firmly in an end portion of the shaft when projecting through the housing opening, a peripheral aperture in the housing provided with a removable closure supporting a caliper assembly inside the housing at a position at which its opposite arms overlie opposite sides of the disc, the arms carrying light generating and light-sensitive elements respectively so that an electrical signal provided by the light-sensitive elements is a function of the rotational movement of the disc. An adjustment facility is also provided which allows the caliper assembly limited arcuate movement with respect to the shaft axis during setting up of the encoder.

9 Claims, 6 Drawing Figures

OPTICAL ENCODER

This invention relates to an optical encoder and is more specifically concerned with one employing a rotary disc fixable to a shaft and which is provided with opaque and transparent markings which alternate with one another and are brought, by rotation of the disc, between one or more sources of light and photo-sensitive elements. The photosensitive elements provide electrical output from which the precise position of the disc and thus the shaft driving it, may be ascertained at any particular moment. Alternatively, the rotational speed of the shaft can be checked by the frequency of the electrical output. As an optical encoder has no parts which rub against one another, the wear is minimal.

Optical encoders lie in a completely different field of expertise from motors and rotating components to which they are fitted. They are therefore normally available only as sealed units and their integral coupling to a rotating component during manufacture or subsequently by the user poses problems of alignment accuracy and sealing.

SUMMARY OF THE INVENTION

In accordance with the present invention an optical encoder comprises a housing capable of being clamped to an end wall of a motor or rotating component about its shaft, with the end of the motor shaft extending through an opening in the housing. A fixture is provided for mounting an optical encoding disc firmly to the end of the shaft within the housing and a peripheral aperture is provided in the housing with a removable closure therefore such closure supporting a caliper assembly inside the housing at a position at which its opposite arms overlie opposite sides of the disc. The arms of the caliper assembly carry light generating and light-sensitive elements respectively so that an electrical signal provided by the light-sensitive elements is a function of the rotational movement of the disc. Means are also provided for adjusting the caliper assembly through limited arcuate movement with respect to the shaft axis during setting up of the encoder.

Preferably the arcuate adjustment of the caliper assembly is effected by allowing the closure limited circumferential movement relative to the housing. Such movement may be achieved by means of a zero-adjustment screw acting against an anti-hysteresis screw.

Another way of providing arcuate adjustment for the caliper assembly is to arrange for the entire housing, including the closure, to be rocked a limited extent arcuately about the shaft opening when in its mounting position. When the adjustment is correct, clamps or other devices can be used to anchor the housing rigidly to the end wall of the motor.

The invention further includes a closed loop speed controller having a motor driven by gated pulses from a pulse generator by way of a comparator which compares the repetition rate of the pulses received with the repetition rate of impulses provided by an optical encoder fixed externally to one end wall of the motor and comprising an optical encoder disc rigidly attached to an end portion of the motor shaft which projects through an opening in the housing of the encoder, a wall opening provided with a closure on which a caliper assembly is attached having arms which overlie respective sides of the disc, a light source or sources provided on one arm of the caliper assembly opposite the position of one or each of a number of light-sensitive elements provided on the other arm of the caliper assembly, means for adjusting the position of the caliper arcuately relative to the shaft axis, the electrical connections extending from the light-sensitive elements by way of the closure to the comparator to supply it with impulses as they are generated by the rotation of the disc on the motor shaft.

Preferably the two arms of the caliper assembly are provided by printed circuit boards on which the or each light source and the or each light-sensitive element is mounted.

DETAILED DESCRIPTION OF PREFERRED EMBODIMENT

The invention will now be described in more detail, by way of example, with reference to the accompanying drawings, in which.

Figure 1:
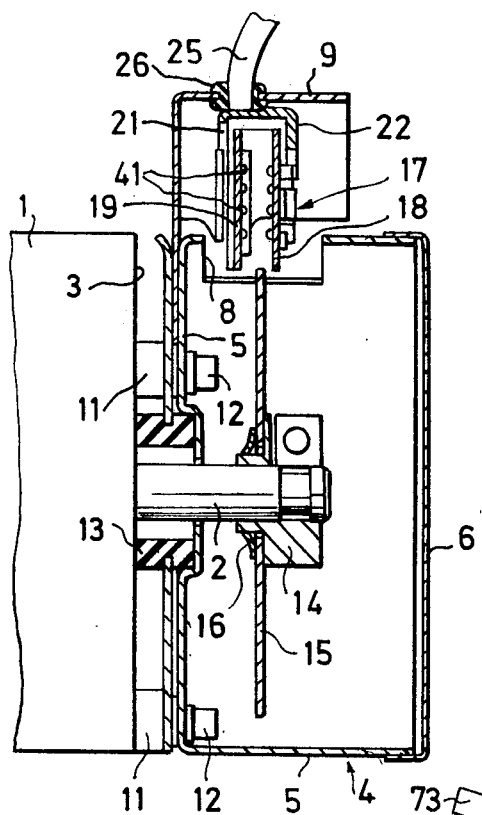
FIG. 1 is a vertical section through an optical encoder fitted to a motor shaft, showing the caliper assembly and closure on which it is mounted partially removed from the main encoder housing.

Referring to FIG. 1 a motor 1 has a shaft 2 projecting from one end wall 3 and passing into the interior of an optical encoder generally shown at 4. The encoder comprises a shallow cylindrical housing 5 provided with an end cap 6 and an opening through which the end portion of the shaft 2 extends. The housing has a part-cylindrical wall opening 8 which is closed by a closure 9.

The encoder is held spaced from the end wall of the motor 3 by an insulating air gap bridged by three legs 11 which are suitably attached to the end wall and which are symmetrically arranged around the axis of the shaft 2. An apertured guide disc 7 is held spaced from the circular back wall of the housing 5 by washers to leave a narrow gap there-between, and clamping bolts 12 passing through the housing 5, the washers and the disc 7 are screwed into threaded bores in the legs 11. A seal 13 in the form of a grommet is fitted onto the disc 7 and housing 5 and extends to end wall 3 to provide a seal around the shaft 2 to prevent dust entering the housing.

The shaft 2 has a split collet 14 clamped to it and which supports a thin metal encoder disc 15. The disc is provided with a number of radially spaced rings of coding apertures which are of square or rectangular shape. However printed coding on a transparent disc could be used equally well. The disc 15 is held in place by a spring 16 and adhesive so that it cannot rotate with respect to the shaft 2 or the collet 14. Means, not shown, ensure that the disc 15 is coaxial with respect to the collet and the shaft.

Figure 2:
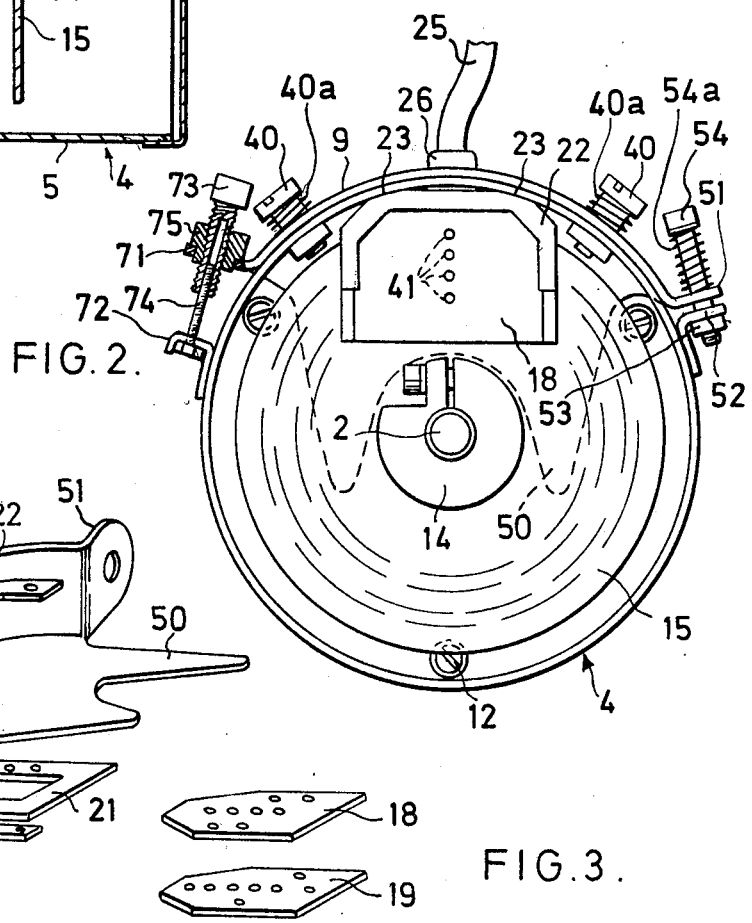
FIG. 2 is the end view of the encoder with an end cap removed.
Figure 3:
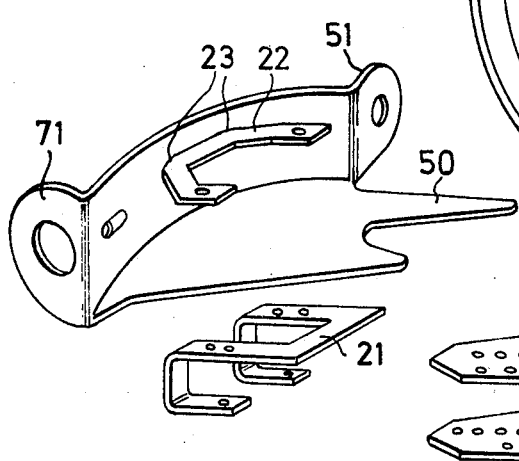
FIG. 3 is an exploded view of principal parts of the closure for the housing, to which the caliper assembly is fixed.

A caliper assembly 17 has arms for overlapping opposite sides of the disc 15 and which comprise two printed circuit boards 18, 19. These are shown in more detail in FIGS. 2 and 3 from the latter of which it will be seen that they are riveted to opposite sides of a bracket 21 which, in turn, is riveted to a metal yoke 22 spot-welded at its corners 23 to the inside surface of the closure 9 which has a guide blade 50 projecting from one edge.

As may clearly be seen from FIG. 1, the closure 9 has an opening which is closed by a grommet 26 surrounding an electrical cable 25 which carries the electrical connections to the circuitry on the printed circuit boards 18 and 19. The closure 9 is urged into place by clamping screws and nuts 40 which are fitted with compression springs 40a and which pass through arcuately elongated slots to allow limited arcuate adjustment of the closure 9 and thus the caliper assembly 17 about the axis of the shaft 2. At one end the closure 9 is provided with an upturned lug 71 adjacent to a lug 72 welded to the outside wall of the housing 5. The two lugs 71 and 72 are joined by a zero adjustment device consisting of two screws 73 and 74 forming a differential arrangement. Screw 73 is provided with a threaded bore to receive screw 74 and screw 73 is threaded in a nut 75 captive upon lug 71. Lug 72 is forked to permit the quick release of the device without separating screws 73 and 74, and the head of screw 74 is such that it cannot rotate in lug 72. The threads of both screws 73 and 74 are right-handed and are so chosen that a fine degree of adjustment of the angular position of the closure 9 can be achieved upon rotation of screw 73, this motion being guided by the snug fit of the guide blades 50 in the narrow gap between disc 7 and housing 5. For example, when using a combination of 10-32 UNF and 4-40 UNC threads at a radius of about 2 inches an adjustment of 10 arc minutes per turn can be achieved. At the other end the closure 9 is provided with an upturned lug 51 having a captive screw 54. An L-bracket 52 is welded to the curved outside wall of the housing 5 and an attached nut 53 in one arm of the bracket 52 is arranged to receive the shank of the screw 54.

The screw 54 has a spring 54a to provide a bias against which the zero-adjustment device can operate and thereby eliminate backlash.

If desired the inner curved surface of the closure 9 may have a number of inward projections, 2 or 3 mm in height, intended to bear against the exterior of the housing 5 adjacent the aperture, thereby spacing the closure by a fixed dimension. The inside curved surface has a felt gasket bonded to it, with the projections located in holes in the gasket, to form a sliding seal to exclude dust from the interior of the housing, the projections ensuring the accuracy of the closure's position.

The end cap 6 may also be provided with a gasket, and the cap 6 may be retained by a spring finger extending from the closure 9 and engaging the extension of the cap 6.

Figure 4:
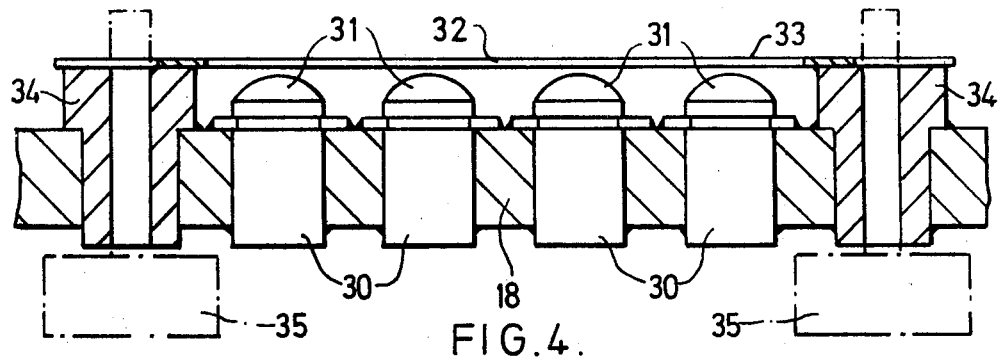
FIG. 4 is a detail of one arm of the caliper assembly showing, in section, how light sensors are arranged.
Figure 5:
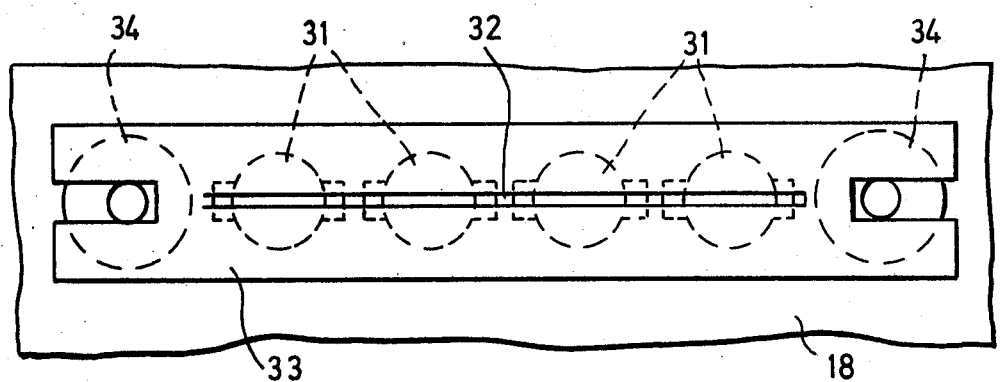
FIG. 5 is a plan view of FIG. 4.

As shown in FIG. 4 the printed circuit board 18 carries four radially in line photoelectric transistors or sensors 30. Each of these has a lens front 31 located behind a slit 32 provided in a masking strip 33 which is supported on mounting studs 34 through which alignment pins 35 are inserted during assembly to ensure that the slot 32 is located correctly in front of the light sensors 30. The slot 32 scans a radial line on the disc 15 in FIG. 1 at a position at which it intercepts the rings of coding apertures formed in it.

The other printed circuit board 19 carries four light sources 41, arranged to emit light to respective light sensors when an aperture of the disc comes between them.

The encoder is fitted as follows.

The end wall 3 of the motor 1 is first of all drilled to enable the spacing legs 11 to be attached rigidly to it. The disc 7, diaphragm 13, and housing 5 with the cap 6 removed, are next fitted over the protruding end of the motor shaft 2 and the fixing bolts 12 are screwed into their respective holes in the legs 11 after being passed through openings in the housing 5, the washers and the disc 7. The split collet 14, to which the coded disc already has been affixed by means of spring 16 and adhesive, is next mounted on the projecting end of the shaft 2 and clamped firmly in a mounting position which can be ascertained by checking with a feeler gauge inserted through the open aperture 8 and fixing the spacing between the back wall of the housing 5 and the collet 14.

The split collet 14 is rotated until the disc orientation with respect to the shaft 2 is judged to be correct. It is then clamped securely to the shaft 2. The blade 50 serves the additional function of ensuring the caliper arms pass either side of the disc 15 without touching it, and, once the closure 9 is in position, the blade 50 serves the additional function of constraining it to move only arcuately of the shaft 2. The screws 40, 54, 73 and 74 are then fitted, clamping screws 40 being tightened only enough to hold closure 9 firmly in contact with the housing 5 while permitting it limited adjustment peripherally thereof. By turning adjusting screw 73, caliper assembly 17 is shifted against the bias of spring 54a, thereby providing precise arcuate adjustment for accurately synchronizing the electrical output of the encoder with the angle of movement of motor shaft 2. The end cap 6 is finally sprung into position over the circular end rim of the housing.

From the above description it will be appreciated that the encoder can be precisely set up on a motor at site and does not require factory assembly. All the parts are separable from one another, are simply fabricated, and the provision of the caliper assembly on the closure of the housing ensures that the disc 15 can be set up without obstructing the caliper assembly. Likewise the caliper assembly can subsequently be set up without fouling the disc and appropriately adjusted in position.

Figure 6:
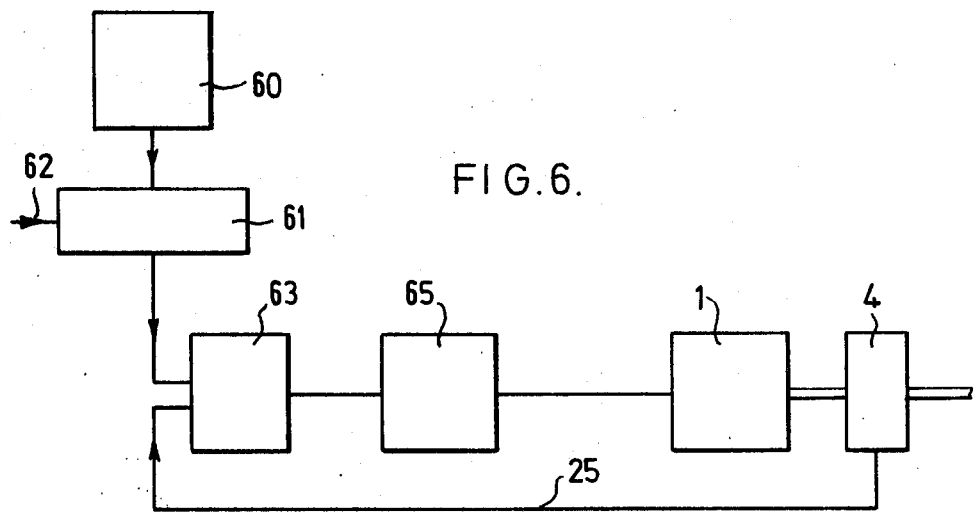
FIG. 6 is a simplified control circuit using the encoder.

FIG. 6 diagrammatically shows a control circuit using the encoder.

The pulse generator 60 provides pulses to a variable divider 61 receiving input signals 62 which determine the repetition rate of pulses to one input of a comparator 63. The other input of the comparator comprises the frequency of signals received from the encoder 4 by way of a cable 25.

As long as the two inputs of the comparator are the same, the comparator provides no output. If the frequencies are different, the direction and extent of the difference is sensed by motor controller 65 which causes the motor 1 speed to change in the direction which reduces to zero the error in the frequencies of the impulses received at the two inputs of the comparator 63.

I claim:
1. An optical encoder comprising
   a housing capable of being secured to the end wall of a motor or rotating component about its shaft, said housing having a peripheral aperture and also an opening for receiving an end portion of said shaft;

a fixture for mounting an optical encoding disc rigidly on said shaft end portion, a removable closure for said peripheral aperture of said housing, a caliper assembly supported by said closure within said housing, said caliper assembly having opposite arms overlying opposite sides of said encoding disc, said arms carrying light-generating and light-sensitive elements, respectively, so that an electrical signal provided by said light-sensitive element is a function of the rotational movement of said disc, and means for adjusting said caliper assembly through limited arcuate movement about the shaft axis.

2. Apparatus as claimed in claim 1, wherein said closure is mounted for limited circumferential movement relative to said housing.

3. Apparatus as claimed in claim 1, wherein said housing is mounted for limited angular movement about the shaft axis.

4. Apparatus as claimed in claim 2, wherein said closure is provided with a guide blade disposed in a plane at right angles to the axis of said shaft, said housing having guide means for receiving said blade in order to guide said caliper assembly with respect to said encoding disc when said assembly is being fitted and adjusted.

5. Apparatus as claimed in claim 2, wherein said means for adjusting said caliper assembly comprises a zero-adjustment device for achieving circumferential adjustment of said closure relative to said housing and means for biasing said closure against such adjustment.

6. Apparatus as claimed in claim 5, wherein said zero-adjustment device is disposed between one circumferential extent of said closure and said housing.

7. Apparatus as claimed in claim 6, wherein said biasing means comprises a spring disposed between the other end of said closure and said housing.

8. Apparatus as claimed in claim 7, wherein said biasing means further comprises a lug on said housing adjacent said other end of said closure and a screw and nut joining said other end of said closure to said lug, said spring being a compression spring mounted for urging said closure in one direction.

9. Apparatus as claimed in claim 7, wherein said zero-adjustment means comprises a first screw threaded into a nut and having a threaded bore and a second screw threaded into said bore, said screws having threads of the same hand but of different pitch.

* * * * *